Feb. 2, 1965  R. L. COPPER  3,168,183
KICKOUT DEVICE
Filed Feb. 27, 1963  2 Sheets-Sheet 2
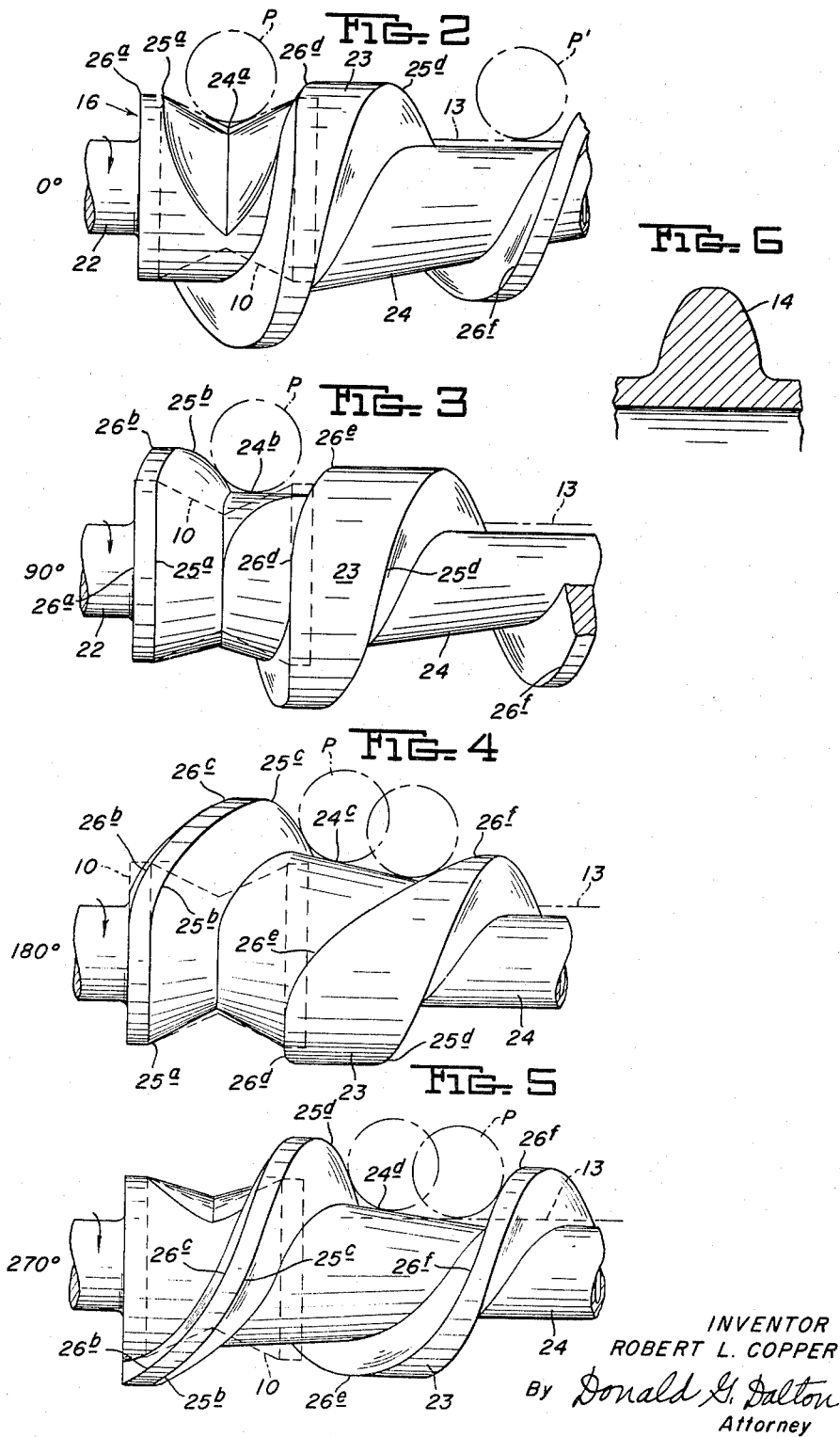
INVENTOR
ROBERT L. COPPER
By Donald G. Dalton
Attorney

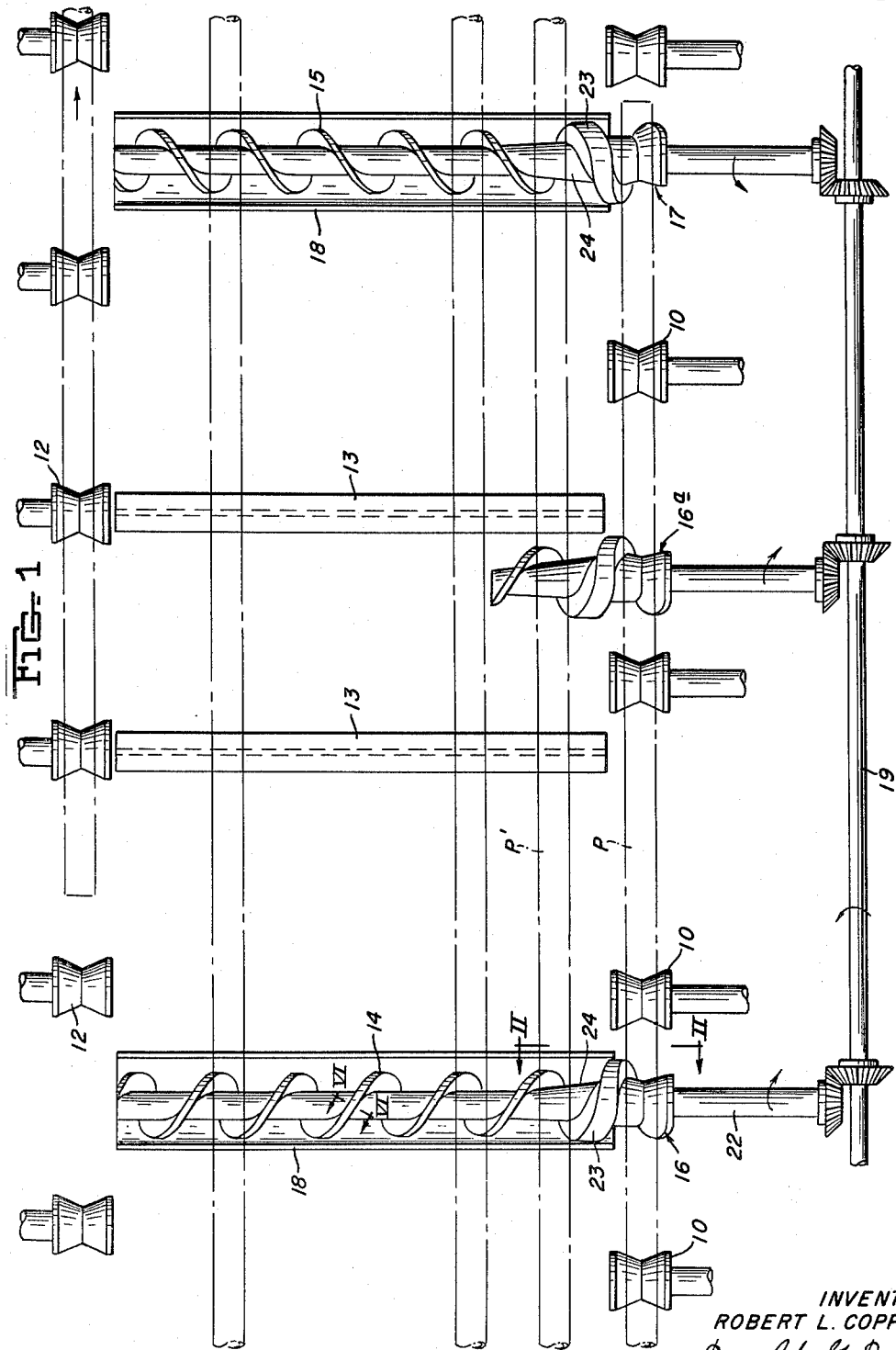

United States Patent Office 3,168,183
Patented Feb. 2, 1965

3,168,183
KICKOUT DEVICE
Robert L. Copper, Wayne Township, Lawrence County, Pa., assignor to United States Steel Corporation, a corporation of New Jersey
Filed Feb. 27, 1963, Ser. No. 261,360
11 Claims. (Cl. 198—20)

This invention relates to an improved kickout device for transferring elongated articles between a roller conveyor and a screw conveyor.

Although my invention is not thus limited, the device is particularly useful in a furnace which reheats steel pipes for further processing during their manufacture. A conventional pipe-reheating furnace includes a series of skids for supporting the pipes and screws for propelling the pipes along the skids. As the pipes enter the furnace, they travel along a series of conveyor rolls from which a kickout device transfers them one at a time to the screws. The pipes may be at temperatures of 1200 to 1400° F. when they enter and 1800 to 2000° F. when they leave for further processing (for example in a sink mill which reduces their outside diameter but not their wall thickness). At these temperatures they are easily damaged by rough handling, and any surface scratches or gouges remain as defects in the finished pipe. Previous kickout devices with which I am familiar do not handle the pipes with the smoothness necessary to avoid damage. They may strike a pipe in lifting it from the conveyor rolls or drop it an appreciable distance in delivering it to the screws, or they may not position the pipe accurately between the screw flights. If the screw flights are of the usual rectangular cross section, they may cut the pipe surface. Nevertheless it is apparent my kickout device can be used elsewhere, for example in transferring articles in the reverse direction, or in a cooling bed.

An object of my invention is to provide an improved kickout device which assures that articles are handled smoothly as they are taken from one conveyor and delivered to the other, thereby avoiding damage to the articles.

A further object is to provide an improved kickout device which lifts articles from a roller conveyor by cam action without striking the surface of the articles and delivers the articles to a screw conveyor positioned accurately between flights without dropping.

A further object is to provide an improved kickout device which can be made integrally with a screw of a conveyor, and in which the flights of both the kickout device and screw are of improved design to avoid cutting the pipe surface.

In accomplishing these and other objects of the invention, I have provided improved details of structure, preferred forms of which are shown in the accompanying drawings, in which:

FIGURE 1 is a top plan view of a portion of a structure which is equipped with kickout devices constructed in accordance with my invention;

FIGURE 2 is a side elevational view of one of the kickout devices in its starting position taken on line II—II of FIGURE 1;

FIGURE 3 is a view similar to FIGURE 2 showing the kickout device after it has rotated 90° from its starting position;

FIGURE 4 is another similar view showing the kickout device after it has rotated 180° from its starting position;

FIGURE 5 is another similar view showing the kickout device after it has rotated 270° from its starting position; and FIGURE 6 is a section on line VI—VI of FIGURE 1 showing a typical cross section of a screw flight.

FIGURE 1 shows a portion of a structure such as a pipe reheating furnace, which includes a plurality of aligned conveyor rolls 10 at its entry side, a plurality of aligned conveyor rolls 12 at its discharge side, a plurality of transverse skids 13, left and right hand screws 14 and 15, left and right hand kickout devices 16 and 17 formed integrally with the respective screws, and an auxiliary left hand kickout device 16a. The structure can also include one or more auxiliary right hand kickout devices not shown. The kickout devices are constructed in accordance with my invention, and preferably the screw flights are of my improved design, but the rest of the structure can be conventional. The screws are supported in troughs 18. The screws and auxiliary kickout devices are connected to a drive 19, indicated only schematically, which intermittently rotates the left hand parts clockwise and the right hand parts counterclockwise. The conveyor rolls 10 carry articles P, for example steel pipes, into the structure traveling in an axial direction. When each article reaches a predetermined position, drive 19 is actuated automatically and turns the kickout devices and screws one revolution and stops, as known in the art. The kickout devices lift article P from the rolls and advance it toward the screws, and at the same time deliver a preceding article P' to the screws. Articles already in the screws advance one turn of the flight with each revolution. The screws deliver an article at the discharge end to the rolls 12 for removal from the structure. The skids 13 actually support the articles in the screws, while the screws merely propel the articles.

FIGURES 2 to 5 show details of one of the left hand kickout devices 16. The right hand kickout devices 17 are similar except reversed. The auxiliary kickout devices likewise are similar except formed separately from any screw. The kickout device 16 includes a body 22 and an eccentric helical flight 23 which is of variable width and extends twice around the body. The flight defines an eccentric groove 24 likewise of variable width. The body 22 is integral with the body of screw 14, and the flight 23 and groove 24 are continuations of the flight and groove of the screw. Starting from the end remote from the screw, the leading edge of flight 23 has a 90° sector 25a of zero lead and increasing radius, a 90° sector 25b of moderate lead (for example 3¾ inches) and increasing radius, a 180° sector 25c of similar lead to sector 25b but decreasing radius, and a 360° sector 25d of larger lead similar to the screw flight (for example 8 inches). The trailing edge of flight 23 has a 90° sector 26a of zero lead and increasing radius, a 90° sector 26b of moderate lead and increasing radius (same as leading edge), a 90° sector 26c of decreasing lead and decreasing radius, a 135° sector 26d of zero lead and decreasing radius, a 135° sector 26e of relatively large lead (for example 6 inches) and increasing radius, and a 180° sector 26f of still larger lead similar to the screw flight. Flight 23 has a greater thickness adjacent body 22 than at its crest. Groove 24 has V-sector 24a bounded by sectors 25a and 26d (zero lead) of the leading and trailing edges of the flight, a sector 24b of gradually increasing radius bounded by sectors 25b and 26e (moderate and relatively large lead) of the leading and trailing edges of the flight and reaching a point 24c of maximum radius, and a sector 24d of gradually decreasing radius bounded by sectors 25c and 26f (largest lead) of the leading and trailing edges of the flight and blending smoothly into the groove of the screw. The groove has a smooth surface where each sector abuts adjacent sectors.

When the kickout device stops, as shown in FIGURE 2, the V-sector 24a of the groove 24 is horizontally aligned with the valleys of the conveyor rolls 10 and faces upwardly. The radius at this point of the V-sector is slightly less than that of the roll valleys to allow article P to travel along the conveyor rolls without interference. When the kickout device starts to rotate, the sector 24b of increasing radius smoothly engages the article and lifts it from the conveyor rolls by a cam action, as shown in FIGURE 3. At the same time the sector 25b of the leading edge of the flight moves the article toward the screws, while the trailing edge controls its movement. When the kickout device rotates a half-revolution, the point 24c of maximum radius faces upwardly and is aligned with the sides of rolls 10, as shown in FIGURE 4. The radius at point 24c is slightly greater than that of the sides of the conveyor rolls, whereby the kickout device lifts the article clear of the rolls. The article moves smoothly into engagement with sector 26e of the trailing edge of the flight. As the kickout device continues to rotate, the article moves into engagement with sector 26f of the trailing edge, as shown in FIGURE 5. When the kickout device completes a revolution and stops, the article is supported on skids 13, as shown with article P' in FIGURE 2. With the next revolution the screws receive the article.

FIGURE 6 shows a typical cross section of the screw flight. The flight has a greater thickness adjacent the screw body than at its crest. The sides and roots of the flight are rounded, and the crest has only a narrow flat portion. This arrangement avoids any sharp edges which might cut the pipe surface.

From the foregoing description, it is seen that my invention affords a kickout device of simple construction which assures that an article is handled smoothly as it is transferred between conveyor rolls and screws. The article is not jarred or dropped at any point in the cycle, but is lifted and lowered by an easy cam action. Since the kickout devices are integral with the screws when they are used in a furnace, there is always a smooth transition as the article moves from the kickout devices into the screws and the article is always positioned accurately between threads of the screws. However, the auxiliary kickout devices can be used by themselves in structures where the screws must turn continuously, for example a cooling bed.

While I have shown and described certain preferred embodiments of my invention, it is apparent that other modifications may arise. Therefore, I do not wish to be limited to the disclosure set forth but only by the scope of the appended claims.

I claim:

1. A kickout device comprising a rotatable body and an eccentric helical flight extending approximately twice around the surface of said body and defining an eccentric groove therearound, said groove having in succession an article-receiving sector adjacent one end, a sector of gradually increasing radius axially offset from said article-receiving sector for lifting the article by cam action, and a sector of gradually decreasing radius for lowering the article, said groove having a smooth surface where each sector abuts adjacent sectors, said flight having a leading edge which has a zero lead at said article-receiving sector, a moderate lead at said sector of increasing radius, and a larger lead at said sector of decreasing radius for pushing the article sideways a short distance as it is lifted and a greater distance as it is lowered.

2. A kickout device comprising a rotatable body and an eccentric helical flight extending approximately twice around the surface of the body and defining an eccentric groove therearound, said groove having in succession an article-receiving sector adjacent one end, a sector of gradually increasing radius axially offset from said article-receiving sector and reaching a maximum radius approximately 180° removed therefrom for lifting the article by cam action, and a sector of gradually decreasing radius for lowering the article, said groove having a smooth surface where each sector abuts adjacent sectors, said flight having leading and trailing edges which have zero leads at said article-receiving sector, moderate and relatively large leads at said sector of increasing radius, and still larger leads at said sector of decreasing radius for pushing the article sideways a short distance as it is lifted and a greater distance as it is lowered and controlling its sideways movement.

3. A combined conveyor screw and kickout device comprising an integral rotatable body having coaxial screw and kickout portions, a helical flight extending a multiplicity of turns around the screw portion and defining a groove therearound for containing and propelling an elongated article, and an eccentric helical flight extending approximately twice around the kickout portion and also defining an eccentric groove therearound, the flight and groove of the kickout portion forming continuations of the flight and groove of the screw portion, the groove of the kickout portion having in succession an article-receiving sector remote from the screw portion, a sector of gradually increasing radius axially offset from said article-receiving sector for lifting the article by cam action, and a sector of gradually decreasing radius for lowering the article, the groove of the kickout portion having a smooth surface where each sector abuts adjacent sectors, the flight on the kickout portion having a leading edge which has a zero lead at said article-receiving sector, a moderate lead at said sector of increasing radius, and a larger lead at said sector of decreasing radius for pushing the article sideways a short distance as it is lifted and a greater distance as it is lowered and thus smoothly feeding the article into the groove of the screw portion.

4. A combined conveyor screw and kickout device comprising an integral rotatable body having coaxial screw and kickout portions, a helical flight extending a multiplicity of turns around the screw portion and defining a groove therearound for containing and propelling an elongated article, and an eccentric helical flight extending approximately twice around the kickout portion and also defining an eccentric groove therearound, the flight and groove of the kickout portion forming continuations of the flight and groove of the screw portion, the groove of the kickout portion having in succession an article-receiving sector remote from the screw portion, a sector of gradually increasing radius axially offset from said article-receiving sector and reaching a maximum radius approximately 180° removed therefrom for lifting the article by cam action, and a sector of gradually decreasing radius for lowering the article, the groove of the kickout portion having a smooth surface where each sector abuts adjacent sectors, the flight on the kickout portion having leading and trailing edges which have zero leads at said article-receiving sector, moderate and relatively large leads at said sector of increasing radius, and a still larger lead at said sector of decreasing radius for pushing the article sideways a short distance as it is lifted and a greater distance as it is lowered and controlling its sideways movement and thus smoothly feeding the article into the groove of the screw portion.

5. A device as defined in claim 4 in which said flights have greater thickness adjacent said body than at their crests and in which the sides and roots of the flights are rounded to avoid sharp edges.

6. In a structure which includes a series of rolls for conveying articles into the structure, a plurality of skids extending from said rolls for supporting the articles within the structure, and a plurality of rotatable screws for propelling articles along said skids, the combination therewith of a plurality of kickout devices for transferring articles from said rolls to said skids and screws, each of said kickout devices comprising a body, means rotatably supporting said body, a drive operatively connected with said body and adapted to be actuated when each article on said rolls reaches a predetermined position for rotating said body one revolution, and an eccentric helical flight extending approximately twice around said body and defining an eccentric groove therearound, said groove having in succession an article-receiving sector adjacent one end horizontally aligned with said rolls when said body stops, a sector of gradually increasing radius axially offset from said article-receiving sector for lifting the article from said rolls by cam action, and a sector of gradually decreasing radius for lowering the article, said groove having a smooth surface where each sector abuts adjacent sectors, said flight having a leading edge which has a zero lead at said article-receiving sector, a moderate lead at said sector of increasing radius, and a larger lead at said sector of decreasing radius for pushing the article sideways a short distance as it is lifted and a greater distance as it is lowered and feeding it smoothly to said skids and screws.

7. In a structure which includes a series of rolls for conveying articles into the structure, a plurality of skids extending from said rolls for supporting the articles within the structure, and a plurality of rotatable screws for propelling articles along said skids, the combination therewith of a plurality of kickout devices for transferring articles from said rolls to said skids and screws, each of said kickout devices comprising a body, means rotatably supporting said body, a drive operatively connected with said body and adapted to be actuated when each article on said rolls reaches a predetermined position for rotating said body one revolution, and an eccentric helical flight extending approximately twice around said body and defining an eccentric groove therearound, said groove having in succession an article-receiving sector adjacent one end horizontally aligned with said rolls when said body stops, a sector of gradually increasing radius axially offset from said article-receiving sector and reaching a maximum radius approximately 180° removed therefrom for lifting the article from said rolls by cam action, and a sector of gradually decreasing radius for lowering the article, said groove having a smooth surface where each sector abuts adjacent sectors, said flight having leading and trailing edges which have zero leads at said article-receiving sector, moderate and relatively large leads at said sector of increasing radius and still larger leads at said sector of decreasing radius for pushing the article sideways a short distance as it is lifted and a greater distance as it is lowered and controlling its sideways movement and thus feeding the article smoothly to said skids and screws.

8. A combination as defined in claim 7 in which at least some of said kickout devices are integral and coaxial with said screws.

9. In a structure which includes a series of rolls for conveying articles into the structure, and a plurality of skids extending from said rolls for supporting the articles within the structure, the combination therewith of a plurality of combined screws and kickout devices for transferring articles from said rolls to said skids and propelling them along said skids, each of said combined devices comprising an integral body having coaxial screw and kickout portions, means rotatably supporting said body, a drive operatively connected with said body and adapted to be actuated when each article on said rolls reaches a predetermined position for rotating said body one revolution, a helical flight extending a multiplicity of turns around the screw portion and defining a groove therearound for containing the article, and an eccentric helical flight extending approximately twice around the kickout portion and also defining an eccentric groove therearound, the flight and groove of the kickout portion forming continuations of the flight and groove of the screw portion, the groove of the kickout portion having in succession an article-receiving sector remote from the screw portion and horizontally aligned with said rolls when said body stops, a sector of gradually increasing radius axially offset from said article-receiving sector and reaching a maximum radius approximately 180° removed therefrom for lifting the article from said rolls by cam action, and a sector of gradually decreasing radius for lowering the article, the groove of the kickout portion having a smooth surface where each sector abuts adjacent sectors, the flight of the kickout portion having leading and trailing edges which have zero leads at said article-receiving sector, moderate and relatively large leads at said sector of increasing radius, and still larger leads at said sector of decreasing radius for pushing the article sideways a short distance as it is lifted and a greater distance as it is lowered and controlling its sideways movement and thus feeding the article smoothly to said skids and screw portion.

10. A combination as defined in claim 9 in which the flights on some of said combined devices are formed as left hand helices and on others as right hand helices.

11. A combination as defined in claim 9 in which said structure is a pipe-reheating furnace.

References Cited in the file of this patent

UNITED STATES PATENTS

| | | |
|---|---|---|
| 2,726,754 | Rodder | Dec. 13, 1955 |
| 3,039,584 | McConnell | June 19, 1962 |